Patented Mar. 20, 1951

2,545,480

UNITED STATES PATENT OFFICE 2,545,480

PRODUCTION OF MELAMINE FROM LIME NITROGEN

Johnstone S. Mackay, Old Greenwich, Conn., assignor to American Cyanamid Company, New York, N. Y., a corporation of Maine No Drawing. Application May 4, 1948, Serial No. 25,070

4 Claims. (Cl. 260—249.7)

This invention relates to the preparation of melamine.

The compound commonly known as melamine is a white crystalline solid having a melting point of about 354° C. It has the empirical formula $C_3N_6H_6$ and is generally believed to have the following structural formula:

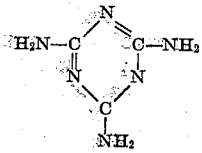

As such, it is frequently called 2,4,6-triamino-1,3,5-triazine. Some of its reactions suggest that it may also exist in whole or in part in one or more isomeric forms such as:

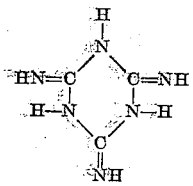

and

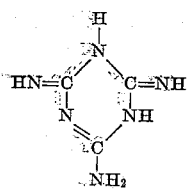

Absolute proof of the exact structure of melamine, or its supposed isomers, has not been definitely established, but the term melamine is commonly recognized and is used herein as including 2,4,6-triamino-1,3,5-triazine and its several isomers.

Although melamine has been known for many years, the only commercially feasible methods for its production have utilized cyanamide or dicyandiamide as starting materials. These latter compounds yield melamine in fair to good yields by polymerization upon heating, either alone or with several different types and kinds of solvents, diluents, catalysts, etc. A few other organic nitrogen compounds, for example, guanidine salts, have been said to yield small percentages of melamine along with various other compounds when heated at temperatures up to about 200° C.

An object of this invention is to prepare melamine from inexpensive raw materials.

A further object is to prepare melamine in a one-step process.

A still further object of this invention is to prepare melamine directly from calcium cyanamide and, in particular, from lime nitrogen (crude calcium cyanamide), without first separating cyanamide or dicyandiamide.

It has been found that melamine can be produced by reacting calcium cyanamide, carbon dioxide, ammonia, and water in an autoclave at temperatures ranging from about 200° C. to about 400° C. under the autogenously produced pressure for from about 1 to about 16 hours. Ammonium carbonate and bicarbonate are equivalents for combinations of carbon dioxide, ammonia, and water, as explained below. The precise chemical equations involved are as yet obscure and applicant does not wish to be bound by any supposed course of reaction. It suffices to say that when calcium cyanamide, ammonia, carbon dioxide, and water are reacted under the specified conditions melamine is obtained in fair yield.

As the purer forms of calcium cyanamide are expensive, the applicant prefers to use the relatively impure but cheap form known in commerce as lime nitrogen. Lime nitrogen commonly analyzes from 60-65% calcium cyanamide, the remainder being lime, graphite, and other impurities. The lime nitrogen used in the examples described below contained about 43% calcium.

Although the reaction takes place within the range of 200°-400° C., it is preferable to conduct the process within the more limited range of 300°-400° C., and it is even more desirable to use a temperature of about 350° C. The table, which follows, shows the effect of temperature on yield of melamine.

Table

Results of heating 40 g. of lime nitrogen (equivalent to 0.43 mole of contained calcium) and 32 g. (0.41 mole) of ammonium bicarbonate together in a 300 cc. autoclave at varying temperatures under the autogenously developed pressure.

| Reaction Conditions | | | Melamine Yield | |
|---|---|---|---|---|
| Time, Hrs. | Temperature, °C. | Pressure, p. s. i. | Grams | Per cent, based on total N in lime nitrogen |
| 1 | 250 | not noted | 2.4 | 18 |
| 2 | 300 | 3,100 | 5.3 | 40 |
| 2 | 350 | 3,100 | 5.8 | 43.5 |
| 2 | 400 | 2,800 | 3.6 | 27 |

Increasing the time of reaction increases the yield slightly. In one experiment 100 g. of lime nitrogen (1.09 moles) and 90 g. of ammonium bicarbonate (1.15 moles) were reacted for two hours at 350° C., yielding 14.7 g. of melamine, or 42.2%. When an identical run was held 16 hours at 350° C., the yield was 16.1 g., or 47.2%.

Melamine can be obtained by the process of this application using various proportions of reactants. However, the best yields are obtained when the ammonia, carbon dioxide, and water are present in about the same proportions as they are present in ammonium bicarbonate, that is, 1:1:1, and the mole ratio of carbon dioxide to the total calcium in the lime nitrogen is about 0.95:1.

The yield of melamine decreases with decreasing lime nitrogen:ammonium bicarbonate ratio. For example, 40 parts by weight of the lime nitrogen were reacted with 32 parts of ammonium bicarbonate in a 300 cc. autoclave for two hours at 350° C. under the autogenously developed pressure, with a melamine yield of 43.5%, and when 100 parts of lime nitrogen were reacted with 90 parts of ammonium bicarbonate under identical conditions, the yield of melamine fell to 32.2%. A 50:90 ratio under the same conditions gave only a negligible yield of melamine.

Increasing the proportion of the ammonia or the carbon dioxide over that available in ammonium bicarbonate does not increase the yield of melamine, as shown in the two following examples.

One hundred grams of lime nitrogen, 50 grams of ammonium bicarbonate, and 20 grams of ammonia (an equivalent of 0.63 mole of ammonium carbonate and 0.55 mole of excess ammonia) were reacted in a 300 cc. autoclave for two hours at 350° C. under a pressure of 3900 lbs./sq. in. The yield of melamine was 8.7 grams, a yield of 25.5% based on the nitrogen in the lime nitrogen.

One hundred grams of lime nitrogen (1.09 moles), 90 grams of ammonium bicarbonate (1.15 moles), and 35 grams of carbon dioxide were reacted for two hours at 350° C. in a 300 cc. autoclave under a pressure of 1475 lbs./sq. in., resulting in 11.5 grams of melamine, a yield of 33.6%.

The process is operable over a wide pressure range. Melamine can be obtained at pressures as low as about 500 lbs./sq. in., and also at pressures of the order of 5000 lbs./sq. in., and even higher.

In the foregoing examples, the use of ammonium bicarbonate has been described instead of mixtures of its components. It will be readily observed by those skilled in the art that it is not necessary to use ammonium bicarbonate as a source of ammonia, carbon dioxide, and water, but that it is simply a convenient means of introducing the three named reactants into the autoclave. It will be obvious that ammonia, carbon dioxide, and water may be introduced into the autoclave either as such or combined in the form of ammonium bicarbonate. Mixtures of these three reactants and ammonium bicarbonate are also suitable. Consequently, when ammonia, carbon dioxide, and water are referred to in this specification, it is to be understood that they may be present as such, as ammonium bicarbonate, or as ammonium carbonate. When an excess of ammonia is introduced, it reacts with ammonium bicarbonate to yield ammonium carbonate.

In the preceding examples, melamine was recovered from the reaction mass, removed from the autoclave by leaching the mass with boiling water, filtering the slurry, and recrystallizing melamine from the hot filtrate. In commercial scale operations, a variety of means for removing melamine from high pressure apparatus can be employed, and those skilled in the art may adapt many of these methods to the removal of melamine formed by the present process. One such method comprises blowing the reaction mass from the autoclave, leaching the mass with a suitable solvent such as hot water, and crystallizing the melamine from the solvent.

While the process of the present invention has been described with reference to specific embodiments, it is not to be considered as limited thereto but should be construed solely in accordance with the scope of the appended claims.

I claim:

1. The method of making melamine which comprises reacting calcium cyanamide, ammonia, carbon dioxide and water in a closed reaction zone at a temperature within the range of 200–400° C. and at a pressure of at least 500 p. s. i., the weight ratio of calcium cyanamide to ammonium bicarbonate stoichiometrically equivalent to said ammonia, carbon dioxide and water being in excess of 50:90, and recovering the thus-formed melamine.

2. The method according to claim 1 in which calcium cyanamide is present as lime nitrogen.

3. The method of making melamine which comprises reacting about 40 parts by weight of lime nitrogen with about 32 parts of ammonium bicarbonate in a closed reaction zone at a temperature within the range of 200° C. to 400° C. at a pressure of at least 500 lbs./sq. in. under melamine-forming conditions, and recovering the thus-formed melamine.

4. The method of making melamine which comprises reacting together about 1 mole of calcium cyanamide, about 1 mole of ammonia, about 1 mole of carbon dioxide, and about 1 mole of water in a closed reaction zone at a temperature of about 350° C. and a pressure of at least 500 lbs./sq. in.

JOHNSTONE S. MACKAY.

REFERENCES CITED

The following references are of record in the file of this patent:

UNITED STATES PATENTS

| Number | Name | Date |
|---|---|---|
| 1,380,223 | Lidholm | May 31, 1921 |
| 2,114,280 | Aldred | Apr. 19, 1938 |
| 2,164,705 | Fisch | July 4, 1939 |
| 2,191,361 | Widmer | Feb. 20, 1940 |
| 2,286,349 | Davis | June 16, 1942 |

FOREIGN PATENTS

| Number | Country | Date |
|---|---|---|
| 583,504 | Great Britain | Dec. 19, 1946 |